United States Patent [19]
Coleman et al.

[11] 3,780,593
[45] Dec. 25, 1973

[54] MAGNETIC FLUID HYDRODYNAMIC BEARING

[75] Inventors: Richard J. Coleman, Hales Corners; David J. Foster, Elm Grove; Edward J. Loper, Jr., New Berlin; Arthur R. Sundeen, Greenfield, all of Wis.

[73] Assignee: General Motors Corporation, Detroit, Mich.

[22] Filed: Oct. 5, 1971

[21] Appl. No.: 186,823

[52] U.S. Cl. .................................. 74/5 R, 308/10
[51] Int. Cl. ............................................ G01c 19/20
[58] Field of Search................. 308/10, 240; 74/5 R

[56] References Cited
UNITED STATES PATENTS

| | | | |
|---|---|---|---|
| 2,809,526 | 10/1957 | Lundberg | 308/10 |
| 3,530,728 | 9/1970 | Evans et al. | 74/5 |
| 3,570,281 | 3/1971 | Albert | 74/5 |
| 3,643,516 | 2/1972 | Jacobson | 74/5 |
| 3,653,267 | 4/1972 | Jacobson | 74/5 |

FOREIGN PATENTS OR APPLICATIONS 854,507  11/1960  Great Britain............................ 74/5

*Primary Examiner*—Manuel A. Antonakas
*Attorney*—E. W. Shristen et al.

[57] ABSTRACT

A pair of stationary soft iron bearings that support the ends of a soft iron shaft each have an annular cavity contiguous with an annular rim. Each shaft end and cavity define a uniform gap that communicates with a divergent pocket defined between the rim and the shaft. To hydrodynamically support the shaft when rotated, a magnetically susceptible bearing fluid is disposed in each gap-and-pocket set and is retained therein by a magnetic field provided by a permanent magnet applied across the gaps and divergent pockets. A field return path around the shaft communicates with the opposite pole regions of the magnet. A gyroscope is illustrated as a suitable environment in which these hydrodynamic bearings might be used.

4 Claims, 3 Drawing Figures

INVENTORS
Richard J. Coleman,
David J. Foster,
Edward J. Loper, Jr. &
BY Arthur R. Sundeen
Albert N. Duke
ATTORNEY

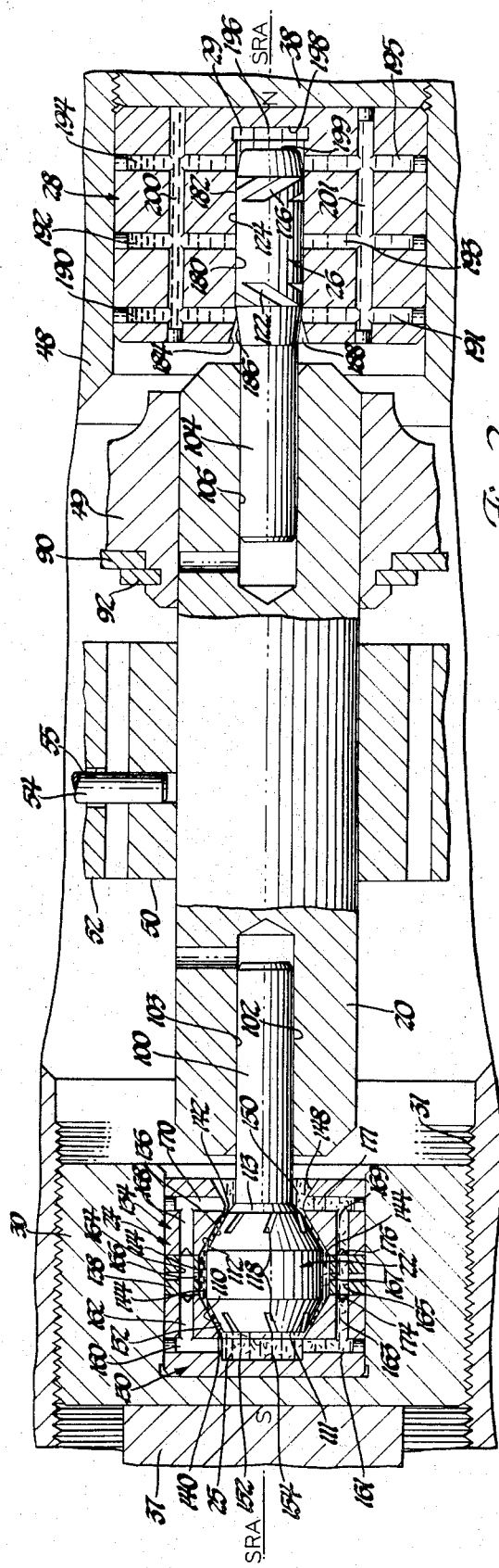

MAGNETIC FLUID HYDRODYNAMIC BEARING

This invention relates to hydrodynamic bearings and particularly bearings of the type employing a magnetic support fluid.

A form of hydrodynamic bearing using a liquid support medium rather than gas affords significant advantages over hydrodynamic bearings using gas. One advantage is that a smaller bearing may be employed to support a given load since the viscosity of the liquid is greater than that of a gas. Another advantage is that the bearing may be operated at pressures below atmospheric pressure. Another advantage is improved boundary lubrication during starting and stopping of the rotor to prevent high speed contact between the bearing surfaces.

One factor heretofore limiting the life of such a bearing has been that the fluid support medium could not be maintained or replenished as it worked itself out of the gap, a problem aggravated not only by gravity, but also by the ingestion of gas into the bearing to force the liquid out of the bearing clearance, and by the temperature expansion of the fluid as the temperature of the bearing increased from its non-operating to its operating levels.

It is therefore desirable to provide a hydrodynamic bearing capable of retaining the support fluid in the presence of forces and temperature changes tending to expel it.

Such a capability is provided in the hydrodynamic bearing of the present invention by a stationary soft iron bearing that cooperates with an end of a soft iron rotor shaft to define therebetween an annular bearing gap that is contiguous with a divergent pocket. A magnetically susceptible bearing fluid is disposed in the gap-and-pocket and is retained therein by a magnetic field provided by a permanent magnet across the gap and decreasing along the divergent pocket. The opposite pole regions of the magnet communicate through a field return path around the shaft.

It is therefore a primary object of the present invention to provide a new and improved hydrodynamic bearing.

It is another primary object of the present invention to provide a hydrodynamic bearing having a magnetically susceptible fluid disposed in a support gap between the rotor and stator and retained in the gap by a magnetic field provided by a permanent magnet.

It is another object of the present invention to provide a hydrodynamic bearing of the foregoing type wherein the permanent magnet defines one pole region that is in magnetic communication with a supported portion of a rotor shaft and another pole region that is in magnetic communication with another portion of the rotor shaft.

It is another object of the present invention to provide in a magnetic-fluid hydrodynamic bearing of the foregoing type, a structure that defines a gap and a divergent pocket communicating with the gap, the gap-and-pocket being between stationary and rotating portions of the bearing and containing the magnet fluid.

It is a further and more specific object of the present invention to provide, in a gap-and-pocket magnetic-fluid hydrodynamic bearing of the foregoing type, structure effecting a uniform magnetic field across the gap for preventing eddy current heating therein and a decreasing magnetic field along the divergent pocket for retaining the magnetic fluid in both the gap and pocket during operation and non-operation of the bearing and during temperature expansion of the fluid.

It is a further and more limited object of the present invention to provide a gap-and-divergent pocket magnetic-fluid hydrodynamic bearing of the foregoing type in a gyroscope having a magnetic shield, wherein the shield provides a field return path between the opposite pole regions of the permanent magnet.

These and other features, objects and details of the present invention will become apparent from the following description taken in conjunction with the appended drawings wherein:

FIG. 2 is an enlarged view of the hydrodynamic bearing shown in FIG. 1; and

FIG. 3 shows an enlarged cross-sectional view of an alternate configuration of hydrodynamic bearings constructed in accordance with the present invention.

Figure 1:
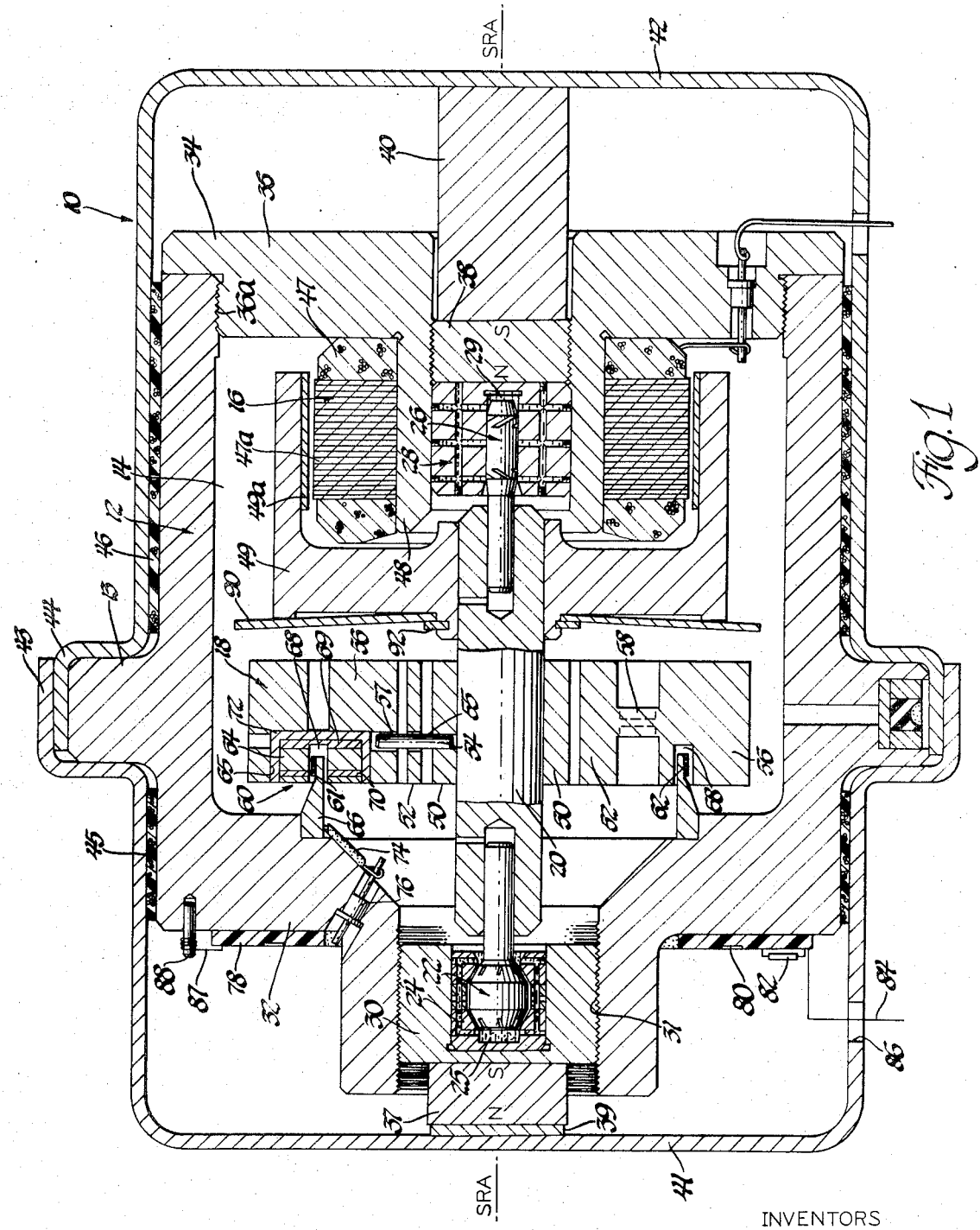
FIG. 1 is a cross-sectional view of a gyroscope wherein a tuned-rotor is supported on a pair of hydrodynamic bearings constructed in accordance with the present invention.

Referring now to FIG. 1, there is shown a gyroscope 10 that includes a cylindrical yoke 12 having a mounting ring 13 and supporting in an internal cavity 14 a two-phase motor 16 for rotating a conventional inertial rotor 18 on a soft iron shaft 20. A duplex-type conical rotor bearing 22 at one end of shaft 20 is supported relative to yoke 12 by a corresponding stator bearing 24, bearings 22 and 24 containing a magnetic fluid 25 therebetween. A journal-type rotor bearing 26 at the other end of shaft 20 is supported relative to yoke 12 by a corresponding stator bearing 28, bearings 26 and 28 containing magnetic fluid 29 therebetween. Stator bearing 24 is positioned precisely along a spin reference axis SRA of gyroscope 10 by a duplex bearing holder 30 threadably engaged with threads 31 and hermetically sealed to one end 32 of yoke 12, such end being known as the pick-off end. Journal stator bearing 28 is similarly positioned along the spin reference axis SRA at the other end 34 of yoke 12, known as the motor end, by a motor and cap 36 threadably engaged by threads 36a and hermetically sealed to yoke 12.

In contact with journal bearing 28 and duplex holder 30 and affixed thereto by a suitable cement are the north and south pole regions respectively of a pair of permanent magnets 37 and 38, the south and north pole regions of which are respectively in contact with soft iron end pieces 39 and 40. These end pieces in turn are in contact with gyroscope magnetic shield cups 41 and 42, that have flanges 43 and 44 overlapping and contacting in the region of mounting flange 13 thereby completing the flux return paths for the fields of the permanent magnets.

Sandwiched between the inner cylindrical surfaces of the magnetic shield cups 41 and 42 and the outer cylindrical surfaces of yoke 12 on either side of mounting flange 13 are a pair of heater blankets 45 and 46, such as heat producing wires embedded in a flexible substrate.

Hysteresis motor 16 includes a stator coil 47 wound around laminations 47a, both the coil 47 and laminations 47a being supported on a hub 48 projecting into cavity 14 from motor end cap 36. Telescoping over the outer periphery laminations 47a and drivably connected with shaft 20 is a hysteresis member 49 carrying a hysteresis ring 49a for being torqued by the rotating magnetic fields produced by stator coil 47.

Conventional inertial rotor 18 includes a hub 50 drivably mounted on shaft 20 and resiliently connected to an inner gimbal 52 by two diametrically opposed cruciform-type resilient hinges (not shown) that allow gimbal 52 to oscillate about an output axis normal to the spin reference axis SRA. Such oscillation is limited, however, by clearance between a stop pin 54 affixed in hub 50 and a bore 55 through gimbal 52. Gimbal 52 is in turn flexibly connected to an outer gimbal 56 by a second pair of diametrically-opposed cruciform-type resilient hinges 58 that allow gimbal 56 to be displaced relative to yoke 12 about an output axis normal to both the spin axis and the axis defined by the first set of hinges.

With such construction, components of rotation of gyroscope 10 about one axis normal to the spin reference axis effect a displacement of the outer gimbal 56 relative to the other axis normal to the spin reference axis, and the amplitude of such displacement is proportional to the amplitude of the input rotation. In other words, input rotation of a given rate about an axis in the plane of FIG. 1 would effect an oscillation of inner gimbal 52 about the axis normal to the plane of FIG. 1 through the hinges (not shown) between hub 50 and gimbal 52. This oscillation would be communicated through the second set of hinges 58 to effect a displacement of outer gimbal 56 about a second axis, here the output axis, also normal to the SRA axis. Such displacement is also limited by pin 54 to the clearance between pin 54 and a bore 57 in the outer gimbal 56.

To detect and null the amplitude of the displacement of gimbal 56 relative to yoke 12, conventional pick-off and torquing means 60 are provided in the form of a plurality of pick-off and torquing coils 62 that cooperate with the magnetic fields of permanent magnets 64. Four sets of coils 62 are spaced equiangularly about the circumference of an annular shelf 66 depending from pick-off end 32 of yoke 12 into an annular slot 68 in the pick-off end-face of rotor 18. Located in counterbores 65 spaced equi-angularly about the pick-off end-face of rotor 18 and intermediate the two hinge axes therein are four sets of high strength magnets 64 sandwiched between stainless steel spacers 69 and 70, which in turn are contained within a magnetic shield 72, here of 2½% silicon core iron.

Coils 62 cooperate with the field of magnets 64 to develop a signal the frequency of which corresponds to the speed of shaft 20 and the amplitude of which is proportional to the angle of rotation of gyroscope 10 about an axis normal to the spin axis SRA. This signal is communicated by a conductor 74 through a hermetic feed-through connector 76 from cavity 14 to a printed circuit board 78 mounted on the exterior of yoke 12 at pick-off end 32. Printed circuit board 78 contains a plurality of conductive paths 80 embedded therein and connected with components 82. The conductive paths and components respond to the signals developed by coils 62 due to the displacement of rotor 18 to provide a signal proportional to such displacement on a discrete conductor 84 extending through opening 86 in shield cup 41. The magnitude of these signals is referenced to point of constant potential through a connection of a discrete conductor 87 to a ground pin 88 secured in the pick-off end 32 of yoke 12. Torquing signals developed in response to the pick-off signals cause a current to be applied through another hermetic feed-through connector (not shown) and conductor (not shown) to torquing coils 62 to co-act with the field applied by magnet 64 to torque the gimbal 56 so as to null the oscillations.

To isolate the effect of the motor field on pick-off and torquing assembly 60, a magnetic shield 90 is affixed to hysteresis member 49 intermediate motor 16 and rotor 18 by a snap ring 92. To provide a structure having a low reluctance to magnetic fields consistent with dimensional stability and rigidity, shaft 20, bearings 22, 24, 26 and 28, end pieces 39 and 40, as well as shield cups 41 and 42 are made of a material of high magnetic susceptibility such as 52100 steel. On the other hand, to provide a path of maximum reluctance to magnetic fields, the remaining components of the gyro including yoke 12, rotor 18, end cap 36, pick-off torquer shelf 66 and hysteresis member 49 are made of a material having a low magnetic susceptibility such as aluminum.

As shown in the expanded view of FIG. 2 of the duplex and journal bearings of FIG. 1, duplex rotor bearing 22 has a pilot pin 100 having a cylindrical surface 102 securely received in a press fit engagement in pilot hole 103 at one end of shaft 20, and journal rotor bearing 26 has a pilot pin 104 securely received in a press fit engagement with a pilot hole 106 at the other end of shaft 20. Duplex rotor bearing 22 is comprised of two conical surfaces 110 and 112 separated by a cylindrical surface 114. Surface 110 is truncated and terminated at one end on a radial end face 111, and surface 112 is merged with pilot pin 100 by a shoulder 113 therebetween.

Conical surfaces 110 and 112 each define a cone angle $\alpha$ relative to the axis of pin 100 and shaft 20 selected, here about 60°, to effect desired stiffness or compliances against deflecting forces in both the axial and the radial directions. Such stiffnesses in turn are dependent upon the size of the gap between the rotating and stationary bearings, speed of rotation of the rotor, size of the bearing, and the viscosity of the fluid.

To build up the fluid pressure to support the rotor, a plurality of herringbone grooves 118, here of a depth of about 750 micro inches, are provided spaced circumferentially and equally about each conical surface 110 and 112. Grooves 118 commence at the narrow end of conical surfaces 110 and 112 and extend therealong a suitable distance, here about 0.05 inches, at an angle of about 15° with respect to the SRA axis. To suppress the effects of a phenomenon known as "half-frequency whirl" in which the bearing undergoes a rapid increase in the amplitude of deflection when excited at a frequency half that of the rotation of shaft 20, journal bearing 26 includes a first set of herringbone grooves 122 terminating one end of journal surface 124 and a second set of herringborne grooves 126 terminating the other end. These grooves are also of approximately 750 micro inch depth but extend along journal bearings 26 at an angle of about 60° with respect to the SRA axis.

Stationary duplex bearing 24 includes a first bearing member 130 having a smooth annular conical cavity 132 to correspond with conical surface 110 of rotatable duplex bearing 22, the second bearing member 134 having a smooth annular conical cavity 136 corresponding with conical surface 112 of bearing 22, and an annular spacer 138 between members 130 and 132 in juxtaposition with cylindrical surface 114 of bearing 22. When members 130, 134 and 138 are assembled with duplex bearing 22, a first uniform gap 140 is defined between conical surfaces 110 and 132 extending the length of these surfaces, and a similar second uniform gap 142 is defined between conical surfaces 112 and 136. A larger gap 144 is defined between cylindrical surface 114 and an annular spacer 138 and is in communication with both gap 140 and gap 142.

Conical cavity member 134 has, contiguous with conical surface 136 thereof, an annular rim surface 148 diverging outward from the SRA axis toward shaft 20 at an angle of about 30°. Rim 148 defines with cylindrical surface 102 of pilot pin 100 a diverging annular pocket 150 communicating with uniform gap 142. Contiguous gaps 140, 144, 142 and 150 are filled with magnetic fluid 25 having a known coefficient of temperature expansion, here about $560 \times 10^{-6}$ cc/cc-°F. Since the only place into which magnetic fluid 25 can expand with temperature increases is divergent pocket 150, to assure retention and preload of the fluid with expansion, the volume of this pocket must be selected to be greater than the volumetric expansion of fluid 25 from the lower to the upper temperature extremes to which the bearing might be exposed in its operating and non-operating conditions.

Magnetic fluids 25 and 29 are here comprised of a wettable dispersing agent or carrier that has small ferrite particles suspended therein. The wetting agent is preferable a fluorinated oil known as "Krytox-14AB" available from the Du Pont Corporation of Wilmington, Delaware. The particles are preferable 100 angstroms in size and are coated by an organic chemical not only to prevent cohesion among the particles but also to cause the particles to be dispersed by the carrier. It has been found that the carrier fluid comprised of these components has a surface tension of about 18.5 dynes per centimeter at 78.8° F which is low relative to the 52100 steel of the bearings. Thus the carrier is quite wettable on 52100 steel. The fluid has been found to have viscosity of about 200 centipores at operating temperatures of 150° F, and a density of about 2.1 grams per cubic centimeter at this operating temperature. It has also been found that such a fluid has an intrinsic magnetic saturation level that is readily attainable with permanent magnets 37 and 38. Moreover, when the gaps between bearings 22 and 24 and between bearings 26 and 28 are about 200 micro inches and shaft 20 is rotated at about 18,000 rpm, it is believed that the magnetic fluid can support shaft 20 with radial and axial stiffnesses of about 18 micro inches of deflection per pound of deflecting force.

In order to equalize the pressure on the fluid in gaps 140 and 142 when shaft 20 rotates and thereby renders gyroscope 10 less sensitive to the effects of pressure variations on bearing 22, conduits and reservoirs are provided communicating with the various gaps in the bearing. Gap 140 thus communicates with a storage reservoir 152 provided between a counterbore 154 in member 130 and truncated radial face 111 of conical surface 110. Reservoir 152 in turn communicates with gap 144 and divergent pocket 150 through a system of radial and axial conduits. Thus a pair of radially extending conduits 160 and 161 communicate respectively with a pair of axially extending conduits 162 and 163 in bearing member 130. Conduits 162 and 163 communicate with a pair of axially extending conduits 164 and 165 extending through spacer 138, and a pair of radial conduits 166 and 167 in spacer 138 communicate with gap 144. A pair of axially extending conduits 168 and 169 in member 134 communicate with axial conduits 164 and 165 in spacer 138 and with a pair of radial conduits 170 and 171 in member 134. Radial conduits 170 and 171 in turn communicate with diverging pocket 150.

So that axial conduits 161 and 162 of bearing member 130 and axial conduits 169 and 170 of bearing member 134 do not need to be aligned axially with respect to axial conduits 166 and 167 of spacer 138, a first annular groove 174 is provided in bearing member 130 to communicate with axial conduits 161 and 162 therein and also with axial conduits 164 and 165 of spacer 138, and a second annular groove 176 is provided in bearing member 134 to communicate with axial conduits 168 and 169 and axial conduits 164 and 165 in spacer 138.

Journal stator bearing 28 includes a journal bearing cavity 180 that, with journal bearing 26 inserted therein, defines a uniform gap 182 along a length including herringbone grooves 122, journal surface 124, and herringbone grooves 126. Contiguous with journal cavity 180 and diverging radially outwards toward shaft 20 is an annular diverging rim 184 spaced opposite an annular shoulder 186 covering toward pin 104 and defining with rim 184 a divergent pocket 188, here about 30°. This pocket contains and retains magnetic fluid 29 in the same manner as divergent pocket 150 retains magnetic fluid 25 in duplex bearing 22 as will be explained below.

Journal stator bearing 28 has pressure equalization means similar to those of duplex bearing 22 here in the form of a pair of radially extending conduits 190 and 191 communicating with divergent pocket 188, a second pair of radial conduits 192 and 193 communicating with gap 182, and a third pair of radial conduits 194 and 195 communicating with a reservoir 196 between counterbore 198, at the end of cavity 180 and a radial end face 199 on journal bearing 26. Communicating with radial conduits 190, 192 and 194 is a first axially extending conduit 200, and communicating with radial conduits 191, 193 and 195 is a second axially extending conduit 201.

Rather than having duplex conical bearings on one end of a rotor shaft and journal bearings on the other as in the FIG. 1 configuration, single conical bearings may, in an alternate configuration, be placed at each end of the shaft. In such an alternate configuration, as may be better seen with reference to FIG. 3, soft iron shaft 20 has a bore 202 extending axially therethrough to receive pilot pins 203 and 204 of conically-tipped rotor bearings 222 and 226 respectively. Rotor bearings 222 and 226, except for their locations at the opposite ends of shaft 20, are identical in all respects, each having a section of a plurality of herringbone grooves 218 on a conical surface 210 intermediate a truncated tip 233 and an axially extending cylindrical shoulder 249 merged with conical surface 210. Cylindrical shoulder 249 is terminated by a shoulder 251 that abuts against one end of a spacer 252 the other end of which abuts against radial face 255 of shaft 20. Conically tipped bearings 222 and 226 are located and telescoped in a smooth annular conical cavity 232 of stationary bearings 224 and 228 that are threadably received in a yoke 212 of a gyroscope (not shown) by threads 231. With bearings 224 and 228 suitably positioned along the spin reference axis SRA and with spacer 253 suitabley sized, conical surfaces 210 and 232 define a substantially constant gap 240, here about 200 micro inches, between the conical tips 222 and the stationary bearing 224. Each cylindrical shoulder 249 of a conical tip defines with a conical cavity 232 a pocket 250 divering in gap width from a minimum gap contiguous with gap 240 to a maximum gap at shoulder 251. A magnetically susceptible fluid 25, having characteristics as hereinabove described, is disposed in gap 240 and in a portion of divergent pocket 250. To provide a field of uniform density across gap 240 and of decreasing density along diverging pocket 250, permanent magnets 37 and 38 are suitably affixed, here by cement, to stator bearings 224 and 228 concentrically with conical cavities 232. The south pole region of permanent magnet 37 is in contact with radial surface 237 of bearing 224, and the north pole region of permanent magnet 38 is in contact with radial surface 238 of bearing 228. To provide a return path for the fields of magnets 37 and 38, magnetic shield cup 41 contacts the north pole region of magnet 37 and elsewhere (not shown) contacts magnetic shield cup 42, which in turn is in contact with the south pole region of magnet 38.

Secured to shaft 20 intermediate conical tips 222 and 226 is a hysteresis member 294 carrying a hysteresis ring (not shown) that is driven from a motor stator (not shown). Also drivably connected with shaft 20 by a hub 260 is an inertial rotor 256 having a pair of diametrically opposed cruciform-type hinges 258 connecting hub 260 to an outer gimbal (not shown) and having a pair of stop plates 257 for limiting the amplitude of oscillation of rotor 256 about axes normal to the SRA axis.

The forces required to retain magnetic fluids 25 and 29 in gaps 140, 142, 182 and 240 and in divergent pockets 150, 188 and 250 and to preload the fluids against movement at forces below the preload, are created in the divergent pockets 150, 188 and 250 due to the decreasing densities of the permanent fields thereacross with increasing divergence.

The magnitude of the force effected on an element of magnetic fluid in pockets 150, 188 or 250 is believed to be proportional to the square of the applied magnetic field intensity, gap size, gap radius, angle of divergence, and the difference between the permeability of the magnetic fluid and that of free space. This proportionality remains constant for increasing intensities of the magnetic field until intrinsic magnetic saturation occurs (i.e., the value of B at the knee of the BH curve). Thereafter the additional force is proportional to the applied magnetic field intensity and the intrinsic saturation induction of the fluid, gap size, gap radius, and angle of divergence.

Since the stationary portions 24, 28 or 224 of each set of bearings has a smooth bearing surface 132, 136, 180 or 232, the density of the magnetic field is substantially uniform about the circumference at any given axial point. Fluids rotated in any given axial section do not generate eddy current and therefore heating, temperature expansion, and loss of motor efficiency associated therewith do not occur.

Having described two embodiments of the present invention, it is understood that the specific terms and examples are employed in a descriptive sense only and not for the purpose of limitation. Other embodiments of the invention, modifications thereof, and alternatives thereto may be used. We therefore aim in the appended claims to cover such modifications and changes as fall within the true spirit and scope of our invention.

It is claimed:

1. A bearing for a rotor comprising:
   a. permanent magnet means producing a magnetic field having north and south pole regions;
   b. magnetically-susceptible stationary bearing means in magnetic communication with the magnetic field at one of said north and south pole regions, said stationary bearing means having an annular cavity therein;
   c. a magnetically susceptible shaft having first and second portions for communicating with said magnetic field, said first portion rotatably disposed in said annular cavity and defining therebetween a constant gap length and a divergent pocket length contiguous with said constant gap length, said magnetic field being of substantially uniform density along said constant gap length and being of decreasing density along said divergent pocket length;
   d. magnetically susceptible field return means for communicating said magnetic field between said second shaft portion and said other of said north and south pole regions; and
   e. magnetically susceptible fluid means disposed in said gap and pocket lengths for rotatably supporting said first portion of said shaft, said fluid being retained in said pocket and gap lengths by said decreasing density of said magnetic field along said pocket length.

2. A hydrodynamic bearing comprising:
   a. permanent magnet means producing a magnetic field defining first and second pole regions;
   b. magnetically susceptible stationary bearing means in magnetic communication with one of said pole regions, said stationary bearing means having an annular cavity therein and an annular rim length contiguous with and terminating one end of said cavity;
   c. rotor means having a magnetically susceptible shaft, said shaft having first and second magnetic field communication portions, said first portion telescoped by said cavity and rim and spaced from said cavity by a uniform gap length and spaced from said rim by a divergent pocket length in communication with said gap length, said magnetic field being of substantially uniform density along said gap length and being of decreasing density along said divergent pocket length;
   d. magnetically susceptible fluid means disposed in said gap length and divergent pocket length and retained in said gap and pocket length by said decreasing field density along said pocket length;
   e. magnetic field return means in magnetic communication with said second shaft portion and said other region of said permanent magnet means for communicating said magnetic field between said second shaft portion and said other pole region.

3. A gyroscope comprising:
   a. a housing having a cavity and an axis therethrough;
   b. a pair of magnetically susceptible bearing means supported by said housing along said axis, each said bearing means having an annular shaped opening communicating with said housing cavity;
   c. rotor means including a magnetically susceptible rotor shaft located along said axis in said housing and having ends telescoped by said openings in said stationary bearing means, said ends and said stationary bearing means defining therebetween a first length of substantially constant gap and a second length of divering gap, said diverging gap contiguous with said uniform gap and spaced intermediate said uniform gap and said cavity;

d. magnetically susceptible, wettable, and nonconductive fluid means disposed in said uniform and divergent gaps for hydrodynamically supporting said shaft, said fluid completely filling said uniform gap and partially filling said diverging gap;

e. permanent magnet means supported along said axis in contact with one of said stationary bearing means for producing a magnetic field of uniform density along said uniform gap length and of decreasing density along said divergent length, said field along said divergent gap length and said fluid therein cooperating to retain said fluid in said divergent gap length and also said uniform gap length; and f. magnetic field return means supported by said housing and communicating magnetically between said other pole region of said permanent magnet and said other stationary bearing means for providing a closed path for the magnetic field produced by said permanent magnet means from said first pole region of said permanent magnet means, through said first stationary bearing means, said shaft, said second stationary bearing means, and said field return means.

4. A bearing for a rotor comprising:

a. permanent magnet means producing a magnetic field having north and south pole regions;

b. magnetically-susceptible stationary bearing means in magnetic communication with the magnetic field at one of said north and south pole regions, said stationary bearing means having an annular cavity therein;

c. a magnetically susceptible shaft having first and second portions for communicating with said magnetic field, said first portion rotatably disposed in said annular cavity and defining therebetween a gap length and a divergent pocket length contiguous with said gap length, said magnetic field being of decreasing density along said divergent pocket length;

d. magnetically susceptible field return means for communicating said magnetic field between said second shaft portion and said other of said north and south pole regions; and e. magnetically susceptible fluid means disposed in said gap and pocket lengths for rotatably supporting said first portion of said shaft, said fluid being retained in said pocket and gap lengths by said decreasing density of said magnetic field along said pocket length.

* * * * *